United States Patent
Ehrgott (12)

(10) Patent No.: US 6,729,485 B2
(45) Date of Patent: May 4, 2004

(54) STORAGE DEVICE MOUNTING SYSTEM

(76) Inventor: Glenn Alan Ehrgott, 7 Spring La., Long Valley, NJ (US) 07853

( * ) Notice: Subject to any disclaimer, the term of this patent is extended or adjusted under 35 U.S.C. 154(b) by 2 days.

(21) Appl. No.: 10/047,832

(22) Filed: Jan. 15, 2002

(65) Prior Publication Data

US 2002/0117465 A1 Aug. 29, 2002

Related U.S. Application Data

(63) Continuation-in-part of application No. 09/303,530, filed on Apr. 30, 1999, now Pat. No. 6,364,141.

(51) Int. Cl.[7] .................................................. A47F 5/00
(52) U.S. Cl. ............... 211/189; 211/87.01; 248/221.11; 248/222.11
(58) Field of Search ................................ 211/189, 70.6, 211/193, 208, 103, 87.01; 248/221.11, 222.11, 323, 339, 302, 303; 410/101, 104, 105, 116, 149, 150

(56) References Cited

U.S. PATENT DOCUMENTS

| | | | |
|---|---|---|---|
| 3,323,186 A | * | 6/1967 | Rennert |
| 3,439,390 A | * | 4/1969 | Prete |
| 3,765,063 A | * | 10/1973 | Farley |
| 4,079,677 A | * | 3/1978 | Vandergriff et al. |
| 4,465,196 A | * | 8/1984 | Erb |
| 5,702,007 A | * | 12/1997 | Fritz et al. |
| 5,752,791 A | * | 5/1998 | Ehrlich .................. 410/104 |
| 5,785,475 A | * | 7/1998 | Winstel et al. .......... 410/149 X |
| 5,807,047 A | * | 9/1998 | Cox ........................ 410/152 |
| 5,934,849 A | * | 8/1999 | Haire ................... 410/101 X |
| 6,364,141 B1 | * | 4/2002 | Ehrgott ................ 211/70.6 X |

* cited by examiner

Primary Examiner—Robert W. Gibson, Jr.
(74) Attorney, Agent, or Firm—Steven B. Stein, Esq.

(57) ABSTRACT

The present invention provides a mounting device support member, comprising: (a) at least one rigid mounting body comprising a first lateral end and a second lateral end; (b) a first retention device attached to the first lateral end of the rigid mounting body and an opposing second retention device attached to the second lateral end of the rigid mounting body, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position.

The present invention further provides a wheel chock device for supporting a vehicle. Finally, this invention provides a method for storage of implements comprising using the provided storage system.

20 Claims, 13 Drawing Sheets

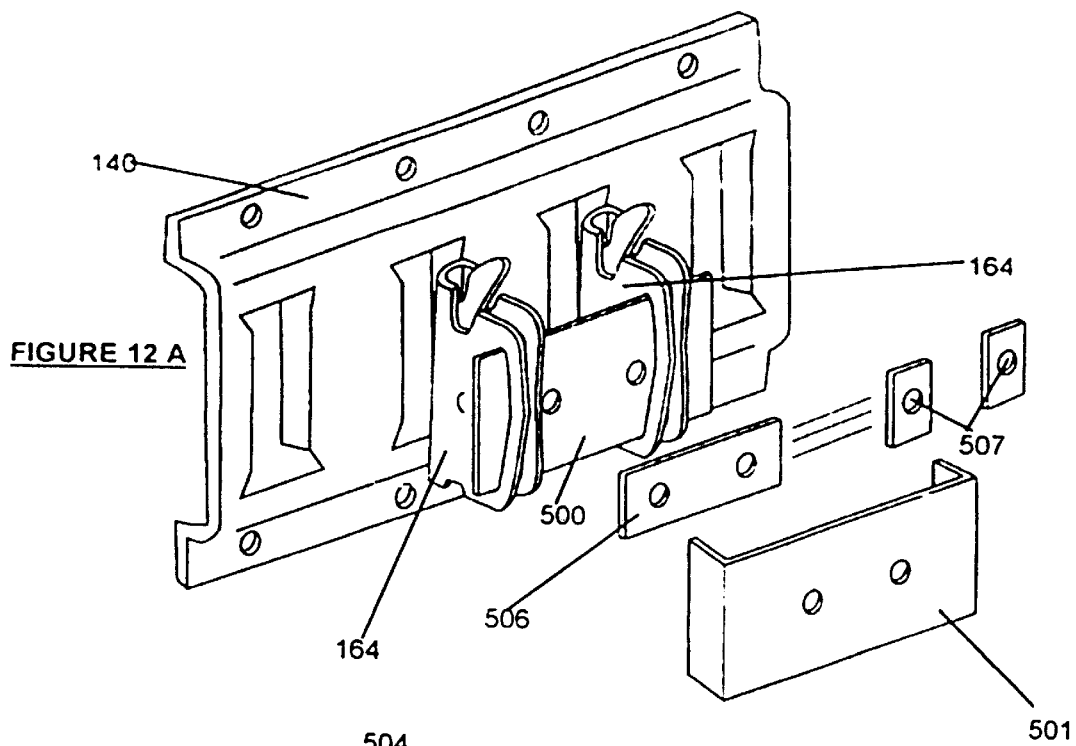
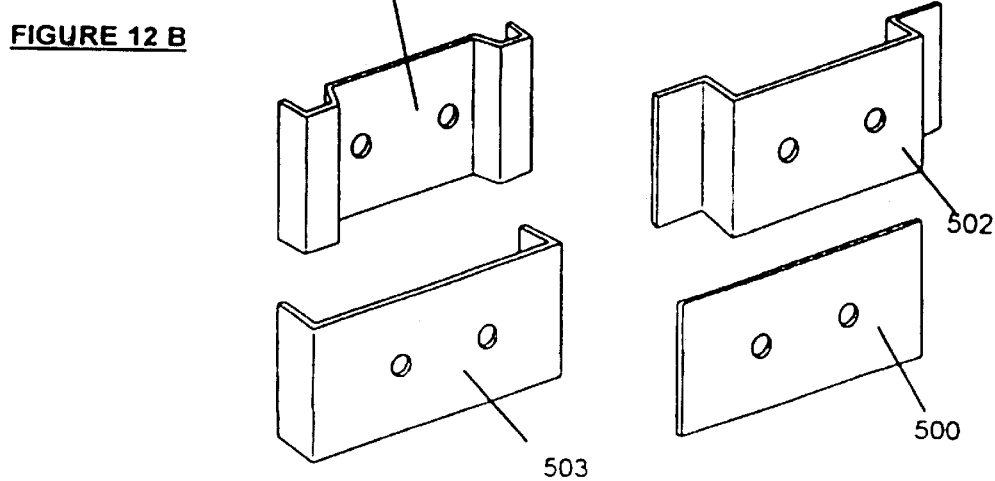

STORAGE DEVICE MOUNTING SYSTEM

The present application is a continuation-in-part of and claims priority to U.S. Application, Ser. No. 09/303,530, filed on Apr. 30, 1999, now U.S. Pat. No. 6,364,141 which is hereby incorporated by reference in its entirety.

FIELD OF THE INVENTION

The present invention relates to a storage device mounting system and more particularly to a storage system, which is adjustable. The storage system comprises load bearing support structures, which are capable of supporting loads of various shapes and sizes. More specifically, the provided storage system is capable of supporting a cantilever load or tension load. The present invention provides a storage system, which can be used more safely in a plurality of environments than the prior art. In addition, the present invention provides a wheel chock for stably and reversibly mounting a vehicle such as a motorcycle.

BACKGROUND OF THE INVENTION

Wall-based and free-standing storage units are well known in the art. Such units are either individually secured to a wall or cooperate with a dedicated rail, slot, or channel or are used with a pegboard or slat wall arrangement. (See U.S. Pat. Nos. 4,318,486; 4,723,663; 4,982,922; 4,867,623; 4,852,747; 5,224,609; 5,265,992; 5,322,256; 5,740,927; 5,807,047 and; 5,839,589). Such arrangement may utilize horizontal bars or rails on which brackets or hooks are mounted in order to support various items. Storage units have been described having hooks permanently attached to specified points on a bar. Other storage systems describe sliding brackets captured on a rail. Additionally, other storage systems provide a changeable, slidable bracket utilizing an open-ended fastener at the back of the bracket which is slipped over the top of the rail. See, U.S. Pat. No. 3,260,489. Further systems employ brackets with fasteners which are trapped on a rail (See, U.S. Pat. Nos. 2,291,966 and 2,546,720). Further still, storage systems have been described which provide wall systems which are readily adjustable to differently shaped loads capable of supporting heavy loads. (See, U.S. Pat. No. 4,318,486). Such systems provide a mounting rail carrying brackets with U-shaped fastener sections which grip the rail but which can be slipped off at one or more grooves in the rail. The wall based systems described herein above limit the type of devices that can be stored. The slidable variety of the systems limit the number of brackets or limit the changing of brackets after the rail or equivalent has been mounted. Importantly, in a mobile environment, brackets could slide in alignment with an open groove and become dislodged or cause stored materials to collide with one another. Other disclosures have provided storage systems and fittings to be employed with a track member wherein the fitting has a positive pivotal retainer means that may be easily operated for locking and unlocking the fitting relative to the track. Such systems provide a secure fitting of cargo for transportation.

Anchor fittings have also been described. Such fittings provide for removably attaching objects to the floor or wall of a vehicle. Such fittings may be operate in conjunction with a track attached to a vehicle floor with the track having alternate notch and neck proportions which matingly engage the fittings. (See, U.S. Pat. Nos. 2,6888,504; 4,033,268; 4,230,432; 4,256,424; 4,708,549; and 5,265,992). Such devices limit use to either a beam supported at both ends, a strap, or an anchor ring type device or opening which cooperates with common cargo control device such as a ratchet strap or load binder.

The prior art also describes fittings, which has a positive pivotal retainer means that may be easily operated for locking and unlocking the fitting relative to openings provided in conjunction with cargo control track. Such fittings provide for removably attaching objects to the floor or wall of a vehicle. Such fittings operate in conjunction with openings provided in cargo control track attached to the floor, walls or ceiling of a vehicle, or other rigid support structure, such as a building, fence, or shed. The prior art devices limit use to either a beam supported at both ends, with insertion member ends attached pivotally, and directly to an insertion member, or attachment of the secondary device is through sewn in non rigid, fabric or woven material. The prior art describes devices limited to either a beam supported at both ends, a strap, or an anchor ring type device or opening which cooperates with a common cargo control device such as a ratchet strap, or load binder. The direct support of objects to be stored, and resulting cantilever, or tension loads are described in U.S. patent Ser. No. 09/303,530.

Wheel chock mounting devices and motorcycle wheel chocks in particular, are also described in the prior art (See U.S. Pat. Nos.: 6,241,104; 4,437,597; 4,852,779; 5,301,817; 5,988,402). Most such devices are bolted in place, and require tools, and extended periods of time to attach, and remove, in many cases requirement more than one person to accomplish this task.

The prior art also describes a keyhole and capture pin mounting, and dismounting device and methods therefore. This requires a bolt down mounting of the capture keyhole plates to a support surface. Mounting the capture plates requires very accurate placement; and alignment of two individual mounting plates. Repositioning is onerous. Moreover, the described prior art device does not provide a positive latching mechanism to maintain the wheel chock in a captured position. Furthermore, the wheel chock is held forward in the captured position only through forward pressure of a motorcycle's tire when secured in a forward position by tie down straps. Should the motorcycle briefly roll rearward the wheel chock could become disengaged from the keyhole slots resulting in a non-secured load situation resulting in the motorcycle rolling forward, which allows the straps to loosen, and possibly allowing the motorcycle to fall. Yet another disadvantage of the described prior art device is that the wheel chocks must be removed and stowed when a motorcycle is not holding the chock in place, failure to do so will allow the chocks to disengage from the keyhole receiver plates, and either roll around in a secured area, or fall off an open vehicle, resulting in the loss of the wheel chock, or the possibility of creating a serious safety hazard should the wheel chock fall in a roadway where vehicles may swerve to avoid it, or collide with it.

The present invention provides distinct advantages over the prior art and solves numerous problems long-described and understood in the field.

SUMMARY OF THE INVENTION

It is therefore an object of this invention to provide a mounting device support member, comprising: (a) at least one rigid mounting body comprising a first lateral end and a second lateral end; (b) a first retention device attached to the first lateral end of the rigid mounting body and an opposing second retention device attached to the second lateral end of the rigid mounting body, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position.

It is a further object of this invention to provide a wheel chock device for supporting a vehicle comprising: (a) a bar bent to form opposing bottom portions, opposing side portions and a U-shaped top portion; (b) a substantially flat plate forming a base attached to said bar bottom portions; (c) at least one retention device rigidly attached to the flat plate, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position. Finally, it is an object of this invention to provide a method for using the provided storage system.

BRIEF DESCRIPTION OF THE FIGURES

FIG. 12A. Rigid mounting body portion inserted through more than one retaining device.

FIG. 12B. Various shaped rigid mounting body portions suitable for attachment as a second rigid mounting body portions to a first rigid mounting body portion.

DETAILED DESCRIPTION OF THE INVENTION

Figure 1:
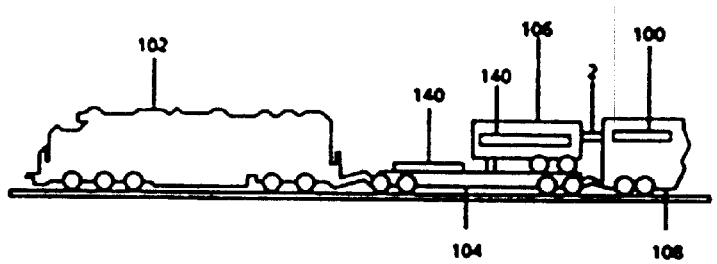
FIG. 1. Cargo Control Track. Cargo Control Track 140 is shown installed in various common vehicles such as on the floor of a flatbed rail car 104, on the walls of a tractor trailer cargo trailer 106, and on the walls of a railroad boxcar 108.

The present invention provides a mounting device support member, comprising: (a) at least one rigid mounting body comprising a first lateral end and a second lateral end; (b) a first retention device attached to the first lateral end of the rigid mounting body and an opposing second retention device attached to the second lateral end of the rigid mounting body, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position.

According to one embodiment of the present invention, the mounting device is further comprising a shaped attachment portion, capable of supporting a load, attached to the rigid mounting body. According to a preferred embodiment of this invention the shaped attachment portion is a ring shape. According to another preferred embodiment of this invention, the shaped attachment portion is a bracket shape. According to still another preferred embodiment of this invention, the shaped attachment portion is a box shape.

According to another embodiment of the present invention, the shaped attachment portion is attached to the rigid mounting body at least one point between the opposing retention devices. According to one embodiment of the present invention, the rigid mounting body is in the form of a flat plate. According to still another embodiment of this invention, the rigid mounting body is inserted through the retention device. According to yet another embodiment of the present invention, the retention device further comprises at least one aperture. According to yet still another embodiment of the present invention the rigid mounting body further comprises a hinged portion. According to one preferred embodiment of the invention, the shaped attachment portion is a ring. According to another preferred embodiment of the invention, the shaped attachment portion is U-shaped. It is specifically contemplated that the shaped attachment portion may be in a variety of shapes and orientations including but not limited to the form of a bracket shape, loop shape, box shape and bar shape. It is also specifically contemplated that the present invention may be adapted for use in securing a variety of loads including but not limited to implements, winches, ratchets, vehicles and securement chocks.

The present invention further provides a wheel chock device for supporting a vehicle comprising: (a) a bar bent to form opposing bottom portions, opposing side portions and a U-shaped top portion; (b) a substantially flat plate forming a base attached to said bar bottom portions; (c) at least one retention device rigidly attached to the flat plate, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position.

According to one embodiment of the present invention, the wheel chock device is further comprising a cargo control track having a plurality of openings formed therein capable of engaging the cargo control track insert. According to another embodiment of the present invention, the substantial flat plate further comprises a longitudinal hinged portion, capable of facilitating vertical flexion of the substantial flat plate. This facilitates insertion of the flat plate into the cargo control track insert. According to yet another embodiment of the present invention, a first retention device is rigidly attached to the one end of the substantially flat plate, and a second retention device is rigidly attached to the opposite end of the substantially flat plate. It is specifically contemplated that the positioning and orientation of the retention device may be horizontally and vertically adjustable with respect to the substantially flat plate. Slidable or telescoping embodiments are also contemplated. It is further specifically contemplated that the retention device may be directly attached to the bent bar, preferably at the bottom portion. According to yet a further embodiment of the present invention, the provided wheel chock device is further comprising at least one stabilizing rod, wherein the stabilizing rod extends from the bottom portion to the top portion. According to a preferred embodiment of this invention, a first stabilizing rod extends from one bottom portion to the top portion and a second stabilizing rod extends from the opposite bottom portion to the top portion so that the first stabilizing rod is substantially parallel to the second stabilizing rod. According to still yet an even further embodiment of the present invention, the wheel chock device is further comprising stabilizing tabs that extend perpendicularly to the control track insert, capable of limiting pivotal movement relative to the cargo control track. Further yet, according to another embodiment of the present invention, a first retention device is removable attached to the one end of the substantially flat plate, and a second retention device is removably attached to the opposite end of the substantially flat plate. Still further is another embodiment of the present invention wherein the rigid mounting body further comprises an attachment pin at each lateral end, capable of being inserted through the retention device.

In addition, the present invention provides a wheel chock device for supporting a vehicle comprising: (a) a bar bent to form opposing bottom portions, opposing side portions and a U-shaped top portion; (b) at least one retention device attached to the bar bottom portions, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving said positive engagement latch between the notch blocking position and the release position.

According to yet another embodiment of the present invention, a plurality of receiving member receptacles are linearly positioned along the receiving member. According to one embodiment of this invention, receiving member receptacle is rectangular in shape. In another embodiment the receiving member receptacle is square in shape. In yet another embodiment the receiving member receptacle is oblong in shape. In still another embodiment, the receiving member receptacle is ovoid in shape. In still yet another embodiment the receiving member receptacle is about circular in shape. In a further still embodiment, the receiving member receptacle is irregular in shape. It is contemplated that the receiving member receptacle may be of a variety of shapes and sizes and depths and widths and lengths. In a preferred embodiment, the receiving member receptacle is rectangular.

According to a further embodiment of the present invention, the receiving member is formed from one of the group consisting of (metal, wood and plastic). It is contemplated that the receiving member may be fashioned from a variety of materials. In a preferred embodiment, the receiving member is metal. In a more preferred embodiment, the receiving member is formed from aluminum or steel. It is further contemplated that the receiving member may be light in weight while still retaining capacity to bear a significant cantilever weight load. According to a still further embodiment of the present invention, the receiving member is capable of being removably mounted on a fixed surface.

According to a yet still further embodiment of the present invention, the mounting body portion of the insertion member is elongated. According to one embodiment of the present invention, the mounting body portion of the insertion member is selected from the group consisting of a hook, a ring a pronged implement holder and a bracket. It is contemplated that the body portion of the insertion member is capable of bearing a significant cantilever weight load. It is further contemplated that the body portion of the insertion member is capable of stably retaining a variety of implements including but not limited to tools, lumber, beams, girders, wire and lines.

According to a yet still further embodiment of the present invention, the load bearing arm is elongated. According to one embodiment of the present invention, the load bearing arm is selected from the group consisting of a hook, a ring a pronged implement holder and a bracket. It is contemplated that the load bearing arm is capable of bearing a significant cantilever weight load. It is further contemplated that the load bearing arm is capable of stably retaining a variety of implements including but not limited to tools, lumber, beams, girders, wire and lines.

Further still, the present invention provides a free standing storage system. Yet further still, the present invention provides a storage system mounted to a fixed surface. According to an embodiment of this invention, the storage system is easily disassembled. According to another embodiment of this invention, the storage system is adjustable in height, length, density and spacing. According to still another embodiment of the present invention, the orientation of the receiving member is horizontal, vertical or diagonal.

Additionally, the present invention provides the rigid mounting body portion of the provided storage system. Also, the present invention provides the load bearing arm of the provided storage system. Further, the present invention provides a wheel chock device for supporting a vehicle.

Finally, the present invention provides a method for storage of implements comprising using the provided storage system.

The present invention may be practiced using common cargo control track. Such track is exemplified by but not limited to track known in the art as "E-track" or "A-track." Such track is a basis of providing horizontal and vertical track sections, as well as individual brackets with one or more receiving member receptacles. The track can be fastened to walls, ceilings, floors, or other fixed surfaces. Alternatively, the track may be fixed to or as free-standing support structures in order to provide a series of receiving member receptacles in which to engage insertion members as storage supports. Such a practice enables the user to hold various implements including, but not limited to shovels, rakes, pick axes, hammers, electrical extension cords, bicycles, spare tires, skis, shelves, emergency equipment and hoses. It is contemplated that the track or receiving member is fastened to an interior of an emergency vehicle. It is further contemplated that the track is fastened to the outside of such a vehicle or other type of mobile structure. The receiving member or its components and accessory devices may be color-coded. Such color coding facilitates rapid assembly of the system. Alternatively, emergency colors such as florescent yellow or orange or red provides indication of various emergency equipment. In another alternative example, color coding may indicate compatibility between various stored implements such as in an technical, medical, pharmaceutical, electrical or plumbing application. Moreover, in a technical setting or a medical setting, such color coding provides indication of compatible equipment, reagents, therapeutics or a particular sequence of use thereof.

A retention device is provided with the various storage support devices which allows them to be added or removed from the mounting track individually with or without tools, and without requiring the removal of adjacent support devices, providing ease of use and accommodating a number of combination of implements. Provision for a positive retention in the form of a latching device is also provided. Positive retention of insertion member support devices eliminates accidental dislodging thereby facilitating use in a wide variety of environments. Mobile environments, in particular are enabled by the positive retention latching device. Moreover, positive retention latches are not easily dislodged through motion and impact which is often associated with the removal and replacement of stored items. This makes the storage system of the present invention safer to use. The storage system of the present invention provides for the display of a number of different shaped and weighted items in a plurality of environments and settings.

As used herein, the term "cantilever" means a projecting beam, girder, post, pole, platform or other structure supported only at one end. As used herein, the term "pivot" means the rotation, swinging or shifting of a short rod, shaft or other member about a related part or member. As used herein, the term "receptacle" refers to an opening, space, groove, slot or hole capable of accepting by insertion another member or part. As used herein, the term "implement" means a tool, device or other utensil including, but not limited to a shovel, a rake, an axe, a spare tire, a cord, a wire, a hammer, a shelf, a hose and a jack.

Figure 2:
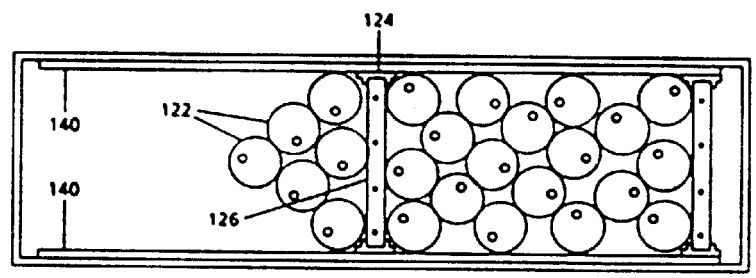
FIG. 2. Top Plan of the Trailer of FIG. 1. Top cutaway view inside the tractor trailer along reference line 2 of FIG. 1. This exemplifies a typical application of cargo control track 140 used to brace heavy cargo 122 from moving using cargo control pockets 124 and cargo control beams supported at both ends 126.
Figure 3:
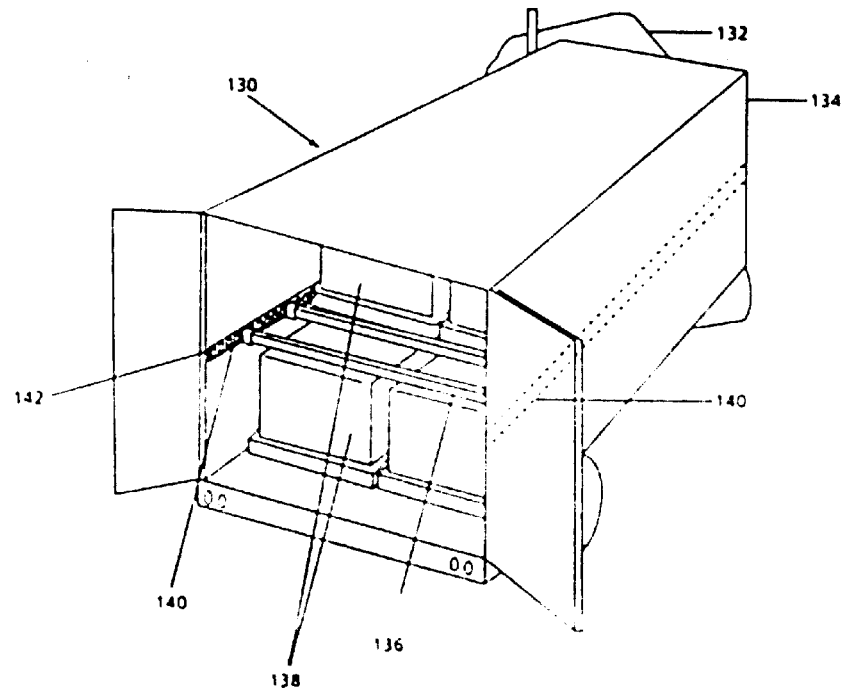
FIG. 3. Use of cargo control tracks 140 to support cargo control beams 136 in cargo control track receiving member receptacles 142 to support palletized cargo 138 inside a trailer 134 pulled by a truck 132 in a typical tractor trailer combination 130.
Figure 4:
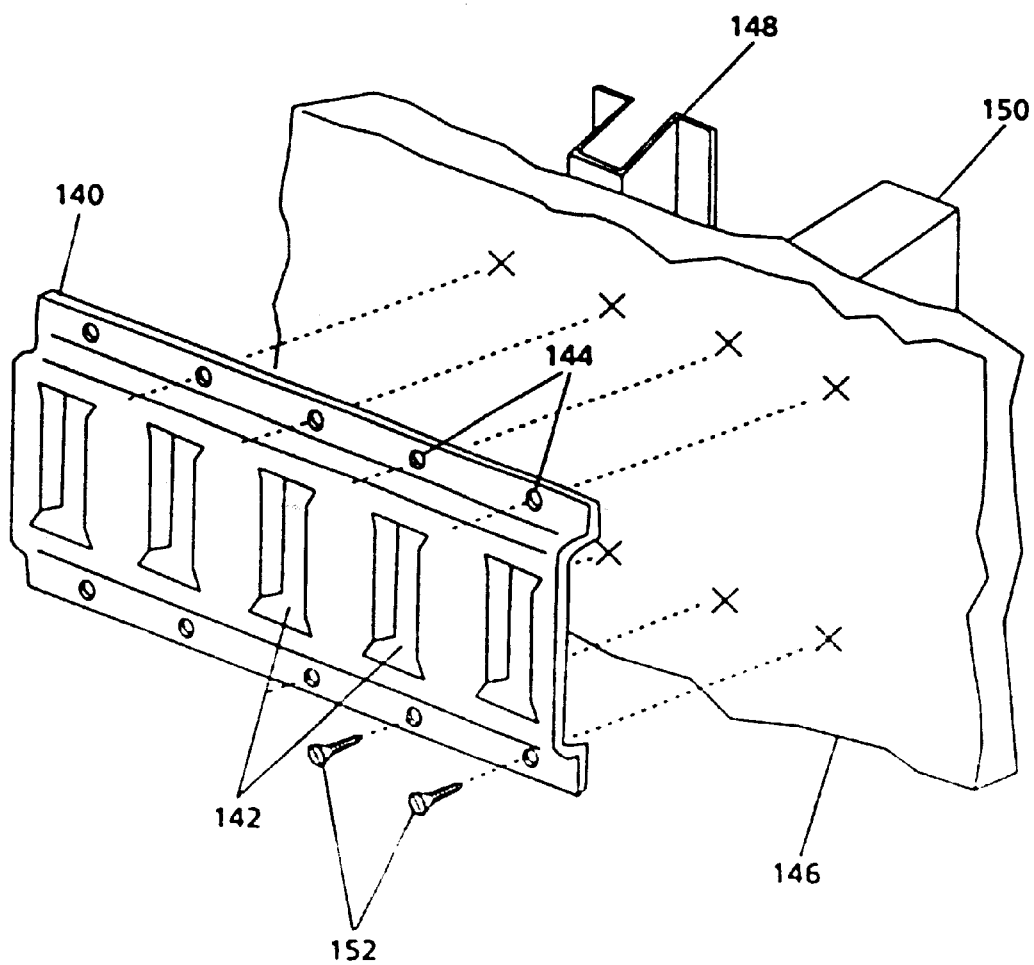
FIG. 4. Cargo control track 140 mounted to a planar surface 146 through the use of screws 152 placed through mounting holes 144. As alternatives to screws, a variety of fastening methods is contemplated including but not limited to bolts, welding, riveting, expansion anchors, and adhesives. The cargo control track may also be directly connected to another singular or multiple support member(s) such as a steel hat section 148 or wooden stud 150.

Referring now to the figures: The Cargo Control Track referred to as the "receiving member" of the provided storage system is shown in FIG. 1. Cargo Control Track 140 is shown installed in various common vehicles such as on the floor of a flatbed rail car 104, on the walls of a tractor-trailer cargo trailer 106, and on the walls of a railroad boxcar 108. FIG. 2 shows the top plan of the trailer of FIG. 1. The top cutaway view inside the tractor-trailer is shown along reference line 2 of FIG. 1. This exemplifies a typical application of cargo control track 140 used to brace heavy cargo 122 from moving using cargo control pockets 124 and cargo control beams supported at both ends 126. FIG. 3 depicts the use of cargo control tracks 140 to support cargo control beams 136 in cargo control track receiving member receptacles 142 to support palletized cargo 138 inside a trailer 134 pulled by a truck 132 in a typical tractor trailer combination 130. FIG. 4 presents cargo control track 140 mounted to a planar surface 146 through the use of screws 152 placed through mounting holes 144. As alternatives to screws, a variety of fastening methods is contemplated including but not limited to bolts, welding, riveting, expansion anchors, and adhesives. The cargo control track may also be directly connected to another singular or multiple support member(s) such as a steel hat section 148 or wooden stud 150. In another embodiment of this invention, the track may be formulated as a free-standing structure. An example of a free-standing structure is a table. The present invention contemplates a variety of free-standing structures including, but not limited to a table, a bench, a bookcase and a cabinet. Moreover, the present invention further contemplates a free-standing structure comprising wheels. An example of such a formulation is a cart.

Figure 5:
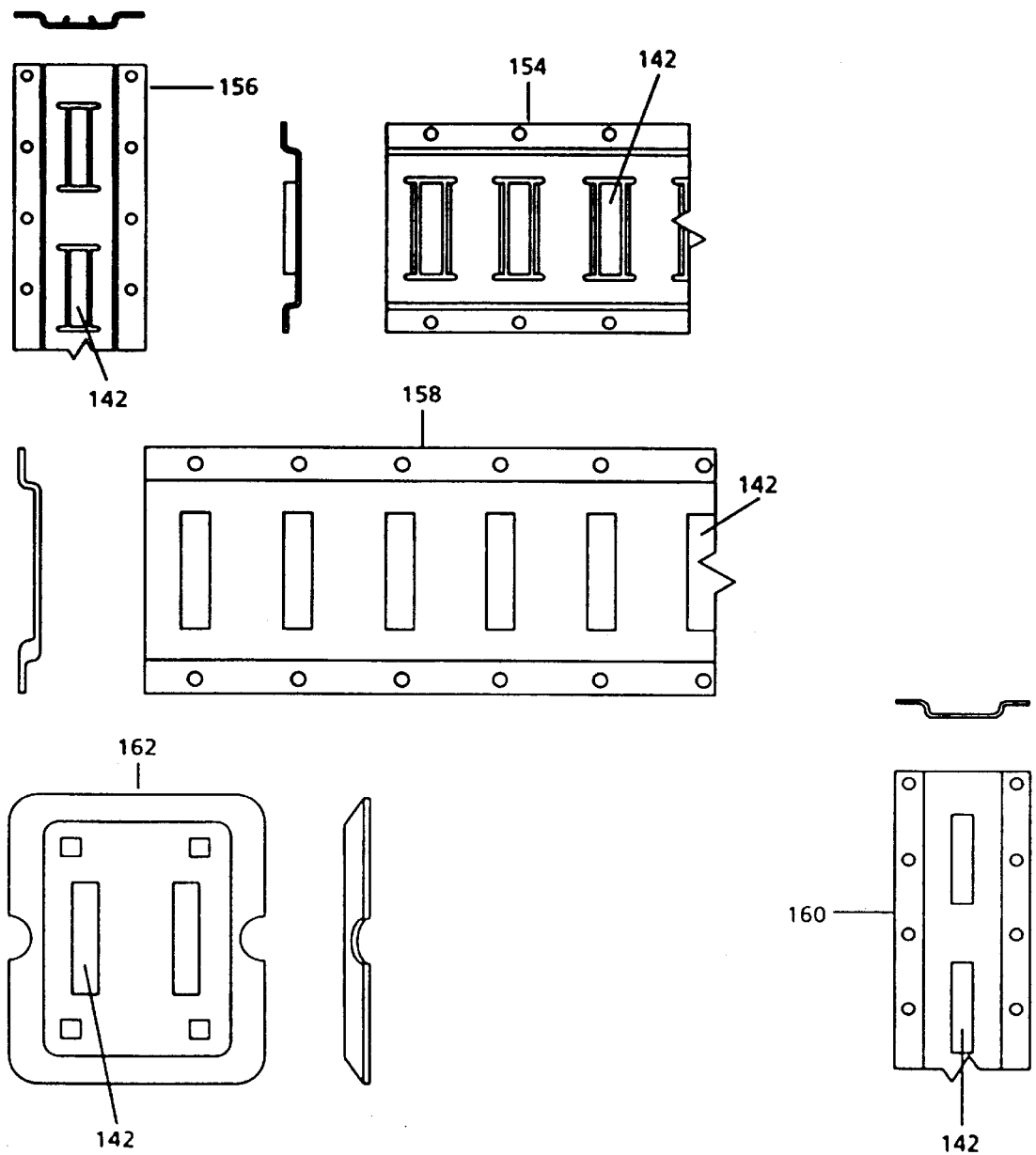
FIG. 5. Track sections including horizontal E-track 154, vertical E-track 156, horizontal A-track 158, vertical A-track 160, and series A-track 162. Such typical configurations are readily available and are used to provide one or more receiving member receptacles 142.

FIG. 5 depicts track sections including horizontal E-track 154, vertical E-track 156, horizontal A-track 158, vertical A-track 160, and series A-track 162. Such typical configurations are readily available and are used to provide one or more receiving member receptacles 142.

Figure 6:
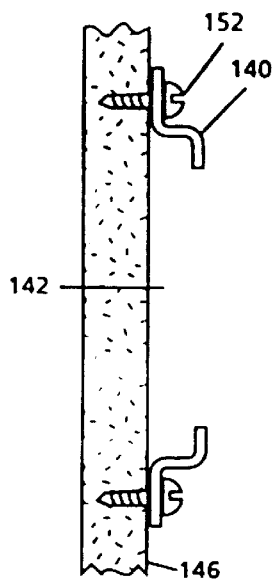
FIG. 6. Cross sectional view of a receiving member receptacle 142 in cargo control track 140, a fastener 152 and a cutaway view of cargo control track 140 attached to a supporting surface 146.
Figure 7:
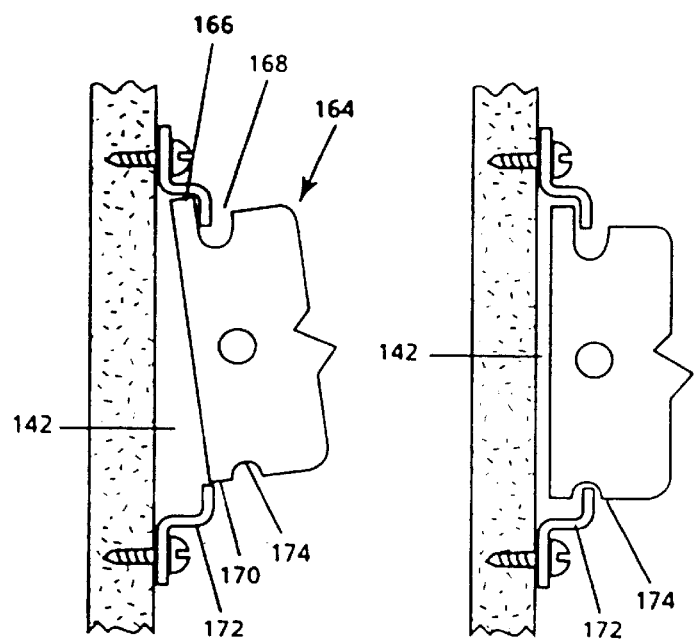
FIG. 7. Typical retention device 164 comprising an upper resilient finger 166 adjacent to an upper notch 168 enabling lifting retention device 164 while inserting upper finger 166 high enough to allow lower resilient finger 170 to clear the lower opposing end edge 172 of the receiving member receptacle 142 and be lowered.
Figure 8:
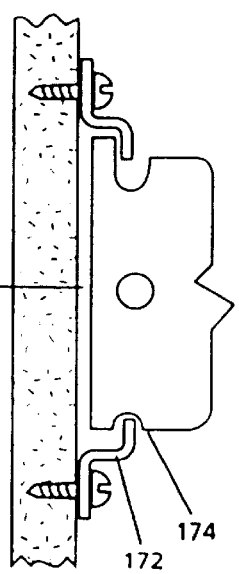
FIG. 8. Lower notch 174 engages the lower opposing end edge 172 of the receiving member receptacle 142. To remove the retention device, the retention device 164 is lifted, tipped tilted or pivoted and lowered from the receiving member receptacle.
Figure 9:
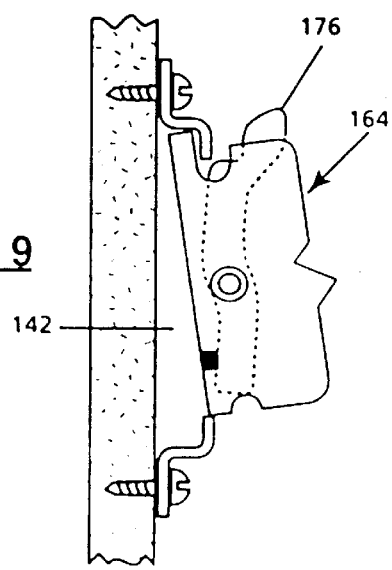
FIG. 9. Engagement of the retention device in a receiving member receptacle as in FIG. 8 adding a positive engagement latch 176 pulled back to enable lifting retention device 164 into the receiving member receptacle 142.
Figure 10:
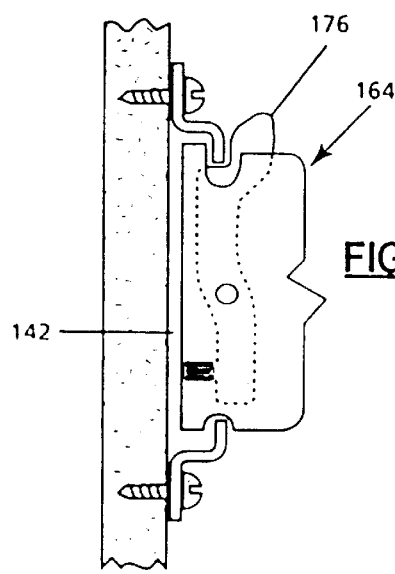
FIG. 10. The positive engagement latch 176 engaged in a position that restricts motion of the retention device thereby preventing its removal from the receiving member receptacle 142. To remove the fitting, positive engagement latch 176 is pulled back away from the receiving member receptacle 142, thereby enabling sufficient motion of the retention device 164 thereby enabling removal from the receiving member receptacle 142.
Figure 11B:
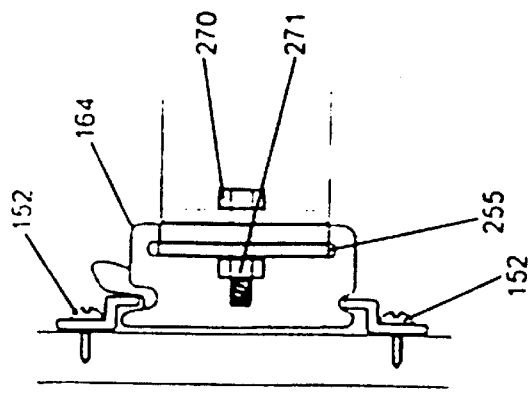
FIG. 11B. Cross sectional view of the assembled storage device support member.
Figure 11A:
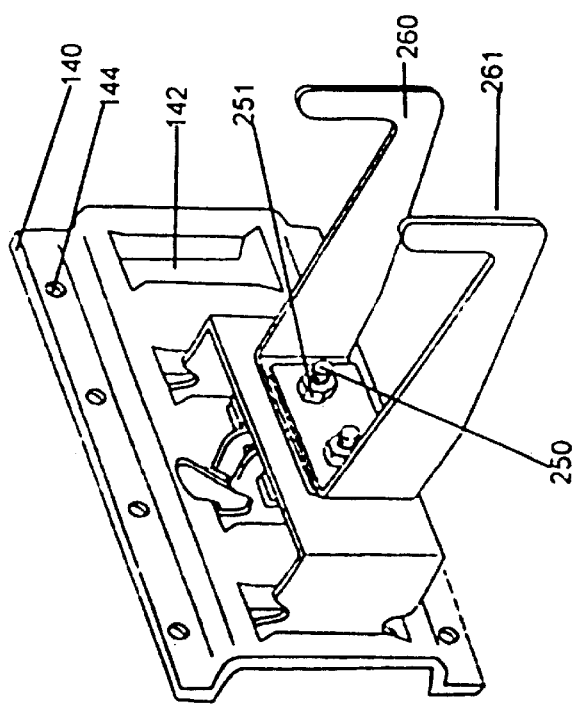
FIG. 11A. Assembled storage device support member insertable into cargo control track and attachable to a load bearing arm.

FIG. 6 exhibits a cross sectional view of a receiving member receptacle 142 in cargo control track 140, the cargo control track, a fastener 152, a cutaway view of cargo control track 140 attached to a supporting surface 146. FIG. 7 describes a typical retention device 164 comprising an upper resilient finger 166 adjacent to an upper notch 168 enabling lifting retention end 164 while inserting upper finger 166 high enough to allow lower resilient finger 170 to clear the lower opposing end edge 172 of the receiving member receptacle 142 and be lowered. The lower notch 174 of FIG. 8 engages the lower opposing end edge 172 of the receiving member receptacle 142. To remove the retention device, the retention device 164 is lifted, tipped or tilted and lowered from the receiving member receptacle. FIG. 9 describes engagement of the retention device in a receiving member receptacle as in FIG. 8 adding a positive engagement latch 176 pulled back to enable lifting retention device 164 into the receiving member receptacle. FIG. 10 exemplifies the positive engagement latch 176 engaged in a position that restricts motion of the retention device thereby preventing its removal from the receiving member receptacle 142. To remove the fitting, positive engagement latch 176 is pulled back, enabling sufficient motion of the retention device 164 thereby enabling removal from the receiving member receptacle 142. As shown in FIG. 11, the storage device support member may be securely assembled by inserting a fastening means such as a nut 250 and bolt 251 through the device component alignable apertures. The entire assembly is insertable into cargo control track 140. In this example, the shaped rigid mounting body portion is attached to a pair of bracket-shaped load bearing arms The spacers 253 provide additional stability. In this example, bracket-shaped load bearing arms which are overlapping mirror image forms provide additional stability. The cross sectional view shown in FIG. 11B demonstrates the inserted retention device 164 showing a rigid mounting body portion 255 transecting the retention device and secured through the alignable apertures by means of a nut 270 and a bolt 271.

Numerous and various attachable and interchangeable load bearing arms, including hook shaped, bracket shaped, box shaped, integrated ring and detachable ring shaped portions are contemplated. It is specifically contemplated that clips or flexible closures may be used to hold a load securely, while enabling easy removal of the load. Similarly, numerous and various shaped rigid mounting body portions are contemplated.

Figure 12C:
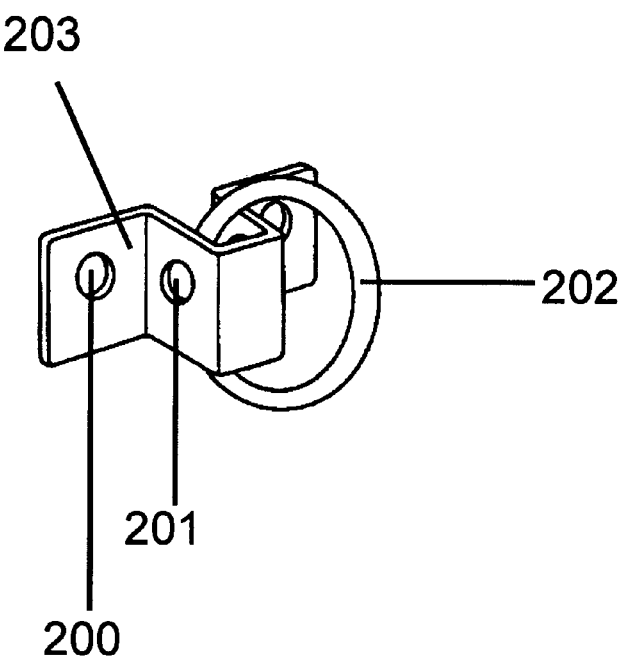
FIG. 12C. Ring attachment for rigid mounting body portion, showing ring 202, rigid mounting body portion 203, and circular apertures 200 and 201.
Figure 13A:
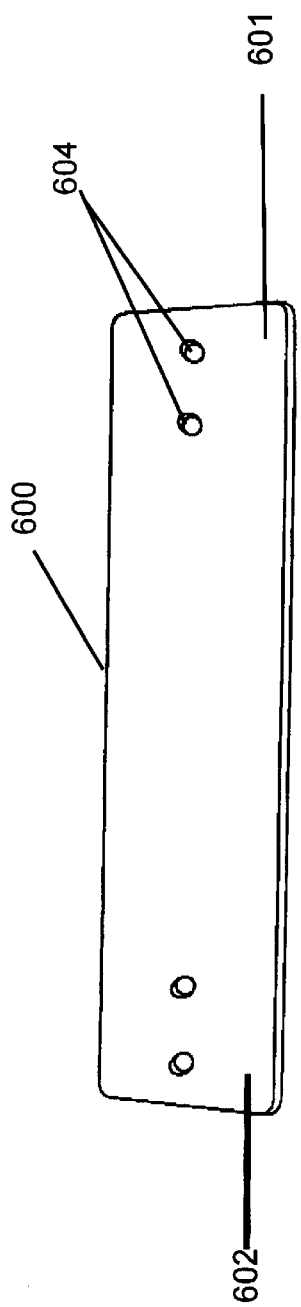
FIG. 13A. Substantially flat plate with a first lateral end and a second lateral end and a plurality of alignable apertures for fastening.
Figure 13B:
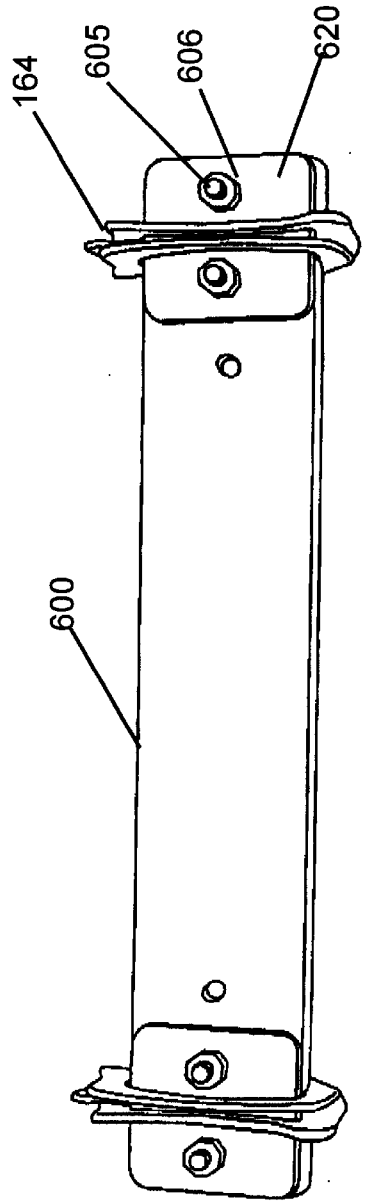
FIG. 13B. Mounting device assembly showing flat plate attached to retention devices.
Figure 13C:
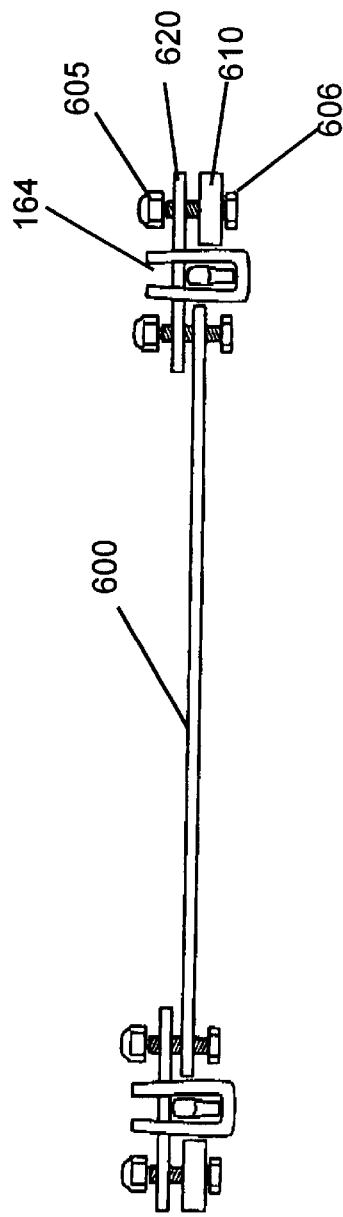
FIG. 13C. Side view of assembled mounting device.
Figure 13D:
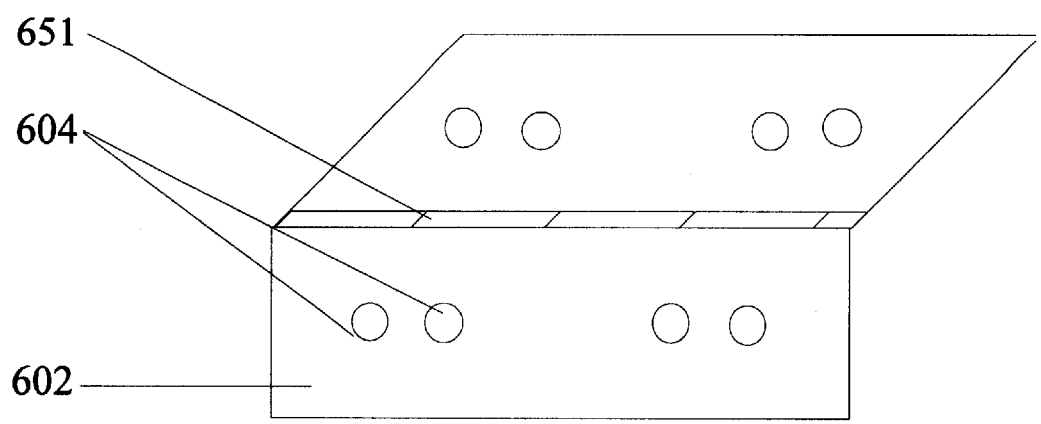
FIG. 13D. Hinged portion of the rigid mounting body, showing rigid mounting body 602, hinge 651, and circular apertures 604.

FIG. 12A exemplifies a rigid mounting body portion 500 in the form of a flat plate inserted through more than one retaining device 164. Insertion through multiple retaining devices provides additional stability. The assembly is shown inserted into cargo control track 142. FIG. 12B exemplifies various shaped rigid mounting body portions 501–504 each suitable for attachment as a second rigid mounting body portions to a first rigid mounting body portion 500 by securing a fastening means through the alignable apertures. A load bearing arm may also be attached to the assembly.

FIG. 13 shows a substantially flat plate rigid mounting body 600 with a first lateral end 601 and a second lateral end 602 and a plurality of alignable apertures for fastening. The first lateral end of the plate 600 is attachable to a first retention device 164 by a fastener means such as a bolt 605 and nut 606. A spacer 610 may be attached to provide addition stability and depth adjustment. The flat plate 600 may be inserted through the retention device 164 or alternatively a second rigid mounting body 620 may be inserted through the retention device 164 and the substantially flat plate attached to the inserted rigid mounting body as shown in the example of FIG. 13. Any means of attachment may be used to attach the mounting body or flat plate to the retention device. Such means includes but is not limited to bolts, screws, rivets or other fasteners, gluing, bonding, welding, pinning, or unibody formation.

Figure 14A:
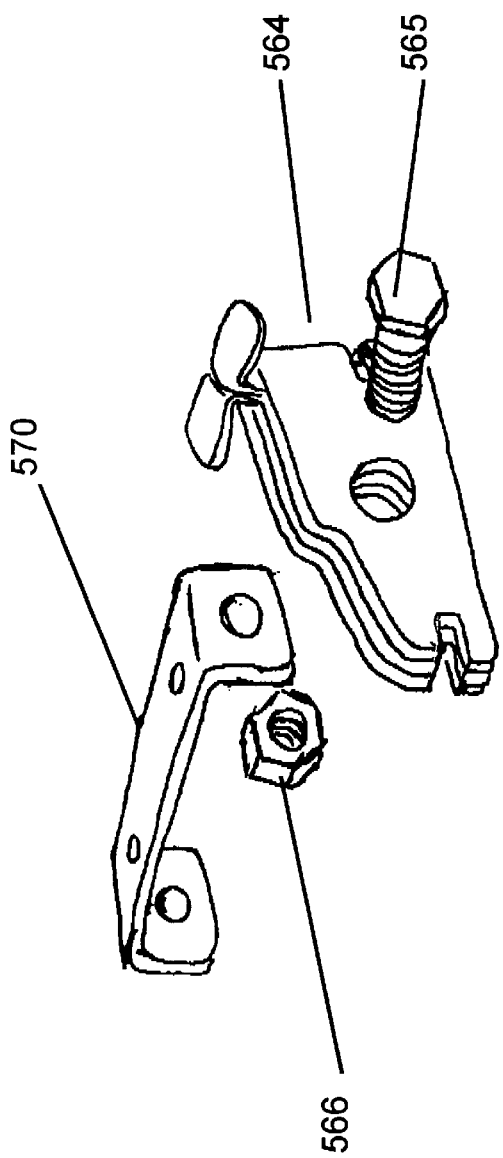
FIG. 14A. Retention device and shaped mounting body.
Figure 14B:
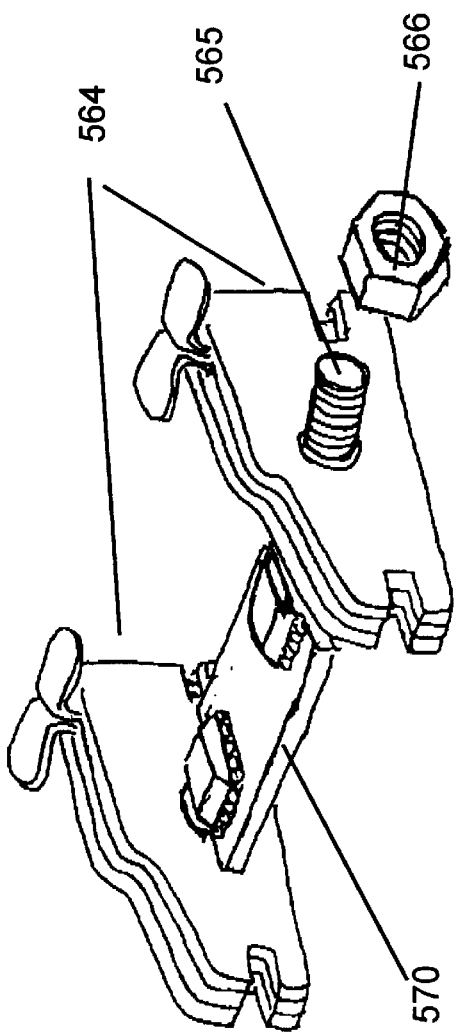
FIG. 14B. Assembled mounting device showing pivotal pin design, facilitating rotation or pivot of the flat plate.
Figure 15A:
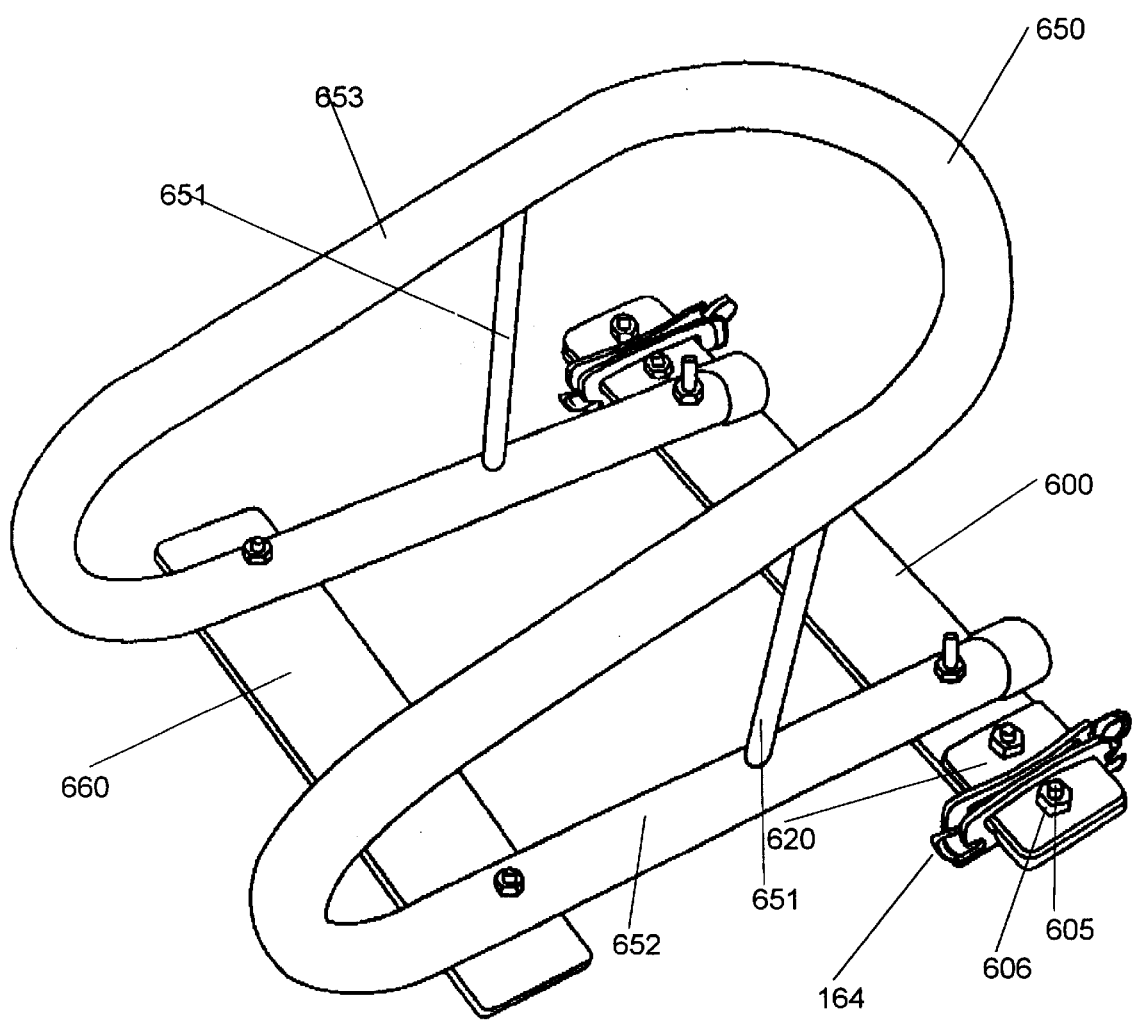
FIG. 15A. Assembled wheel chock with rigidly attached retention devices.
Figure 15B:
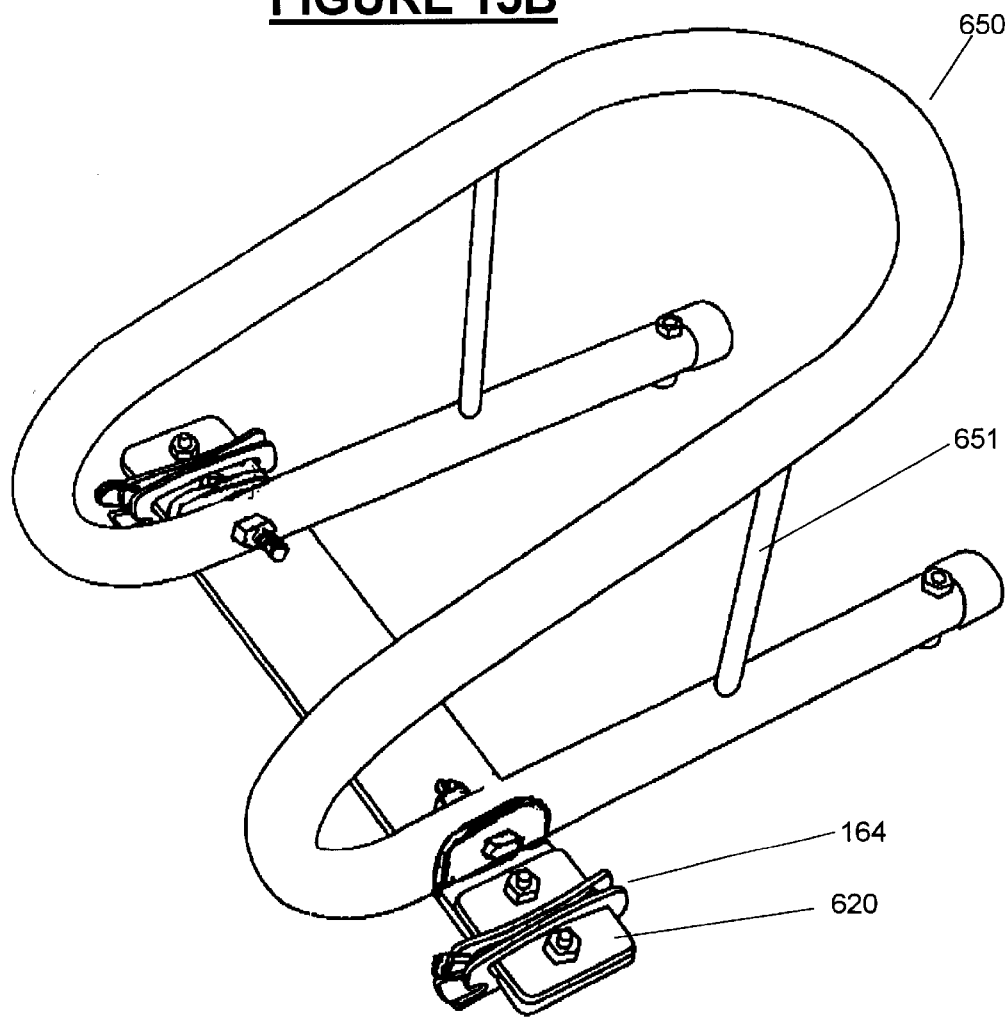
FIG. 15B. Assembled wheel chock with pivotal attachment facilitating pivot of the assembly for insertion to cargo control track.
Figure 15C:
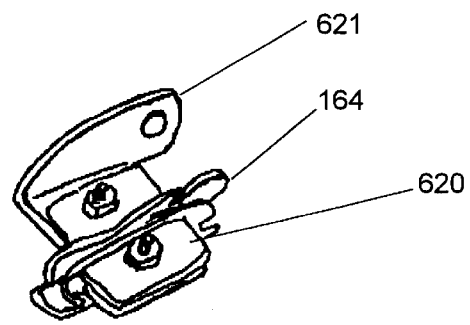
FIG. 15C. Pivot bracket shaped mounting body.
Figure 15D:
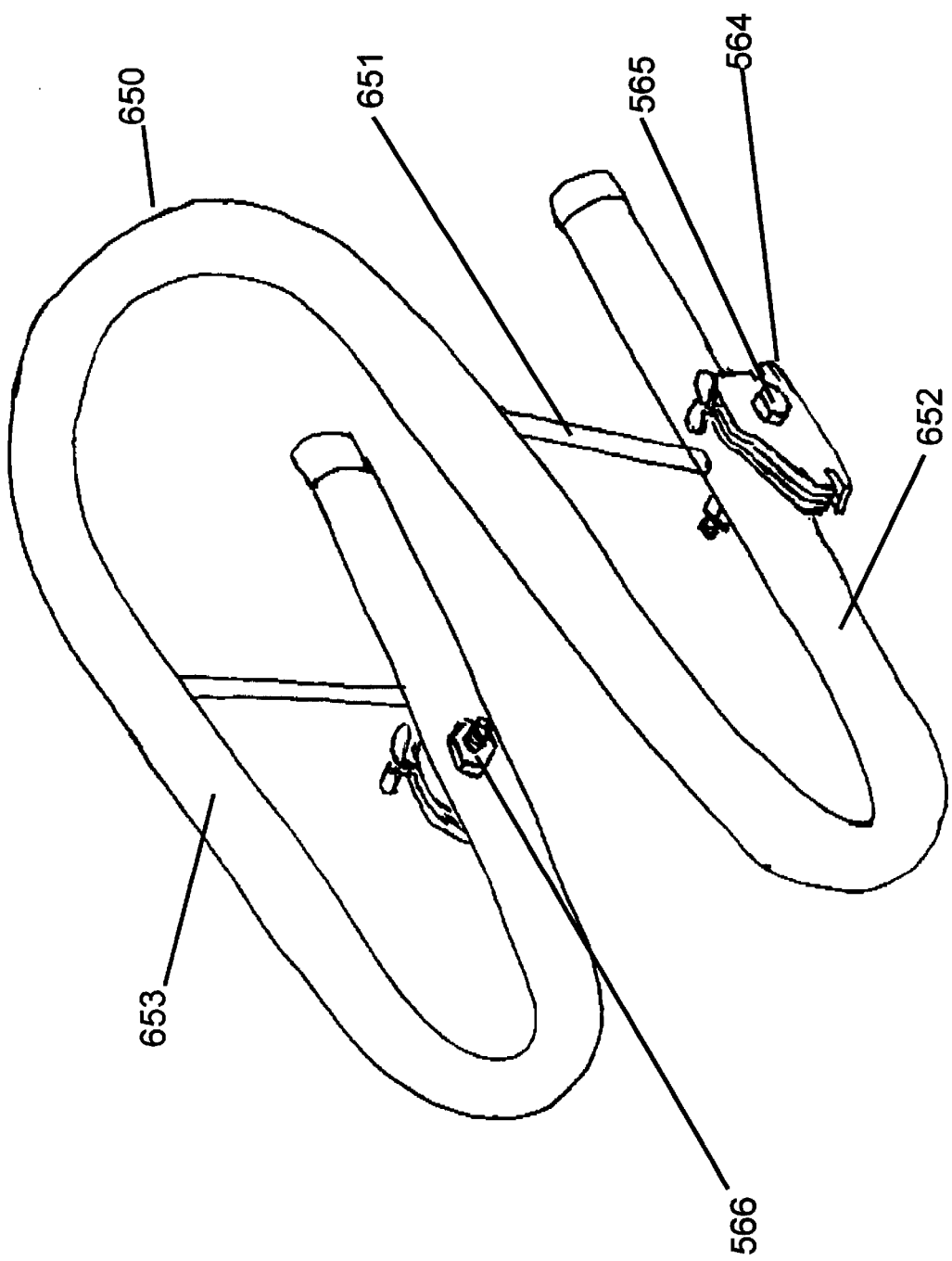
FIG. 15D. Assembled wheel chock mounting device with direct attachment of pivotal retention device to wheel chock body.

FIG. 14 shows another embodiment of a retention device 564 together with a bracket shaped rigid mounting body 570. (See U.S. Pat. No. : 4,867,623). The retention device is attached by any fastening means including but not limited to bolts, screws, rivets, pins, glue, or welding. In the example as shown a bolt 565 is inserted through an aperture in the retention device body 564 and through an aperture in one lateral end of the bracket shaped mounting body 570 and fastened with a nut 566. A second retention device is similarly mounted at the opposite lateral end of the bracket shaped mounting body. According to a preferred embodiment of the invention a pin is inserted through an aperture in the body of the retention device, thus providing a pivoting potential, facilitating rotation of the mounting body, which provides an adjustability of any mounted load bearing arm or other mounting device. This pivoting potential can ease insertion of the assembled device into the cargo control track. Various shaped load bearing arms and load bearing devices can be attached to the flat plate to provide a means for securing a load.

FIG. 15 shows a U-shaped wheel chock attached directly to a flat plate 600 with a rentention device 164 attached at each lateral end as shown in FIG. 13. In the example as shown each retention clip is attached to the flat plate as described in FIG. 13. The assembly is attached to the U-shaped wheel chock by means of fasteners inserted through alignable apertures in the flat plate and the bottom portion of the wheel chock. The exemplified wheel chock further comprises a pair of stabilizing rods 651 extending from the bottom portion of the wheel chock to the top portion, thereby adding stability to the device to function as a load bearing arm. In addition, the exemplified wheel chock further comprises an additional stabilizing plate 660 which provides further stability to the device. The additional stabilizing plate may also comprise retention clips. Numerous means of attachment of the flat plate to the wheel chock are contemplated as exemplified in FIG. 15B. According to one such embodiment, a bracket is provided with an off-center aperture to facilitate pivotal attachment of the wheel chock and thereby facilitate insertion of the assemble device into cargo control track. Alternatively, a retention device may be directly attached to the bottom portion of the wheel chock as shown in FIG. 15D. According to a preferred embodiment, a pivotal attachment as shown in the example, facilitates insertion of the assembled device into cargo control track.

One of skill in the art will recognize that the exemplified wheel chock functions as a load bearing arm and could be substituted with any appropriately shaped load bearing arm in order to secure a load.

The present invention provides the advantage of combining the strength and economy of scale of cargo control track with the novel application of a plurality of interchangeable load support devices including but not limited to hooks and brackets, tension load support devices and overhead mounted hooks and brackets which utilizing a retention device, cooperate with the receiving member receptacles of the cargo control track and may include a positive retention latching device. The track or receiving member may be fastened by commonly known means, including but not limited to screws, bolts, welding, rivets, expansion anchor type, molly type or other suitable fastening methods.

According to the present invention, a storage system includes both horizontally and vertically oriented receiving member cargo control tracks which may be affixed to either a free-standing support structure or the internal support structure of a building, vehicle or other supporting structure such as a fence or a wall.

Throughout this application, various publications and patents and patent applications are referenced. The disclosures of these publications in their entireties are hereby incorporated by reference into this application in order to more fully describe the state of the art.

This invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

I claim:

1. A mounting device support member, comprising:
    a. at least one rigid mounting body comprising a first lateral end and a second lateral end;
    b. a first retention device attached to the first lateral end of the rigid mounting body and an opposing second retention device attached to the second lateral end of the rigid mounting body, the first retention device and opposing second retention device each comprising:
        i. a cargo control track insert, the insert having upper and lower notches which define at least one adjacent resilient finger which extends beyond at least one edge of a receiving member receptacle
        ii. a positive engagement latch, movably mounted on the retention device, the positive engagement latch being movable between a notch blocking position and a release position,
        iii. a positive engagement latch operating means, mounted on the retention device, capable of selectively enabling moving said positive engagement latch between the notch blocking position and the release position, and
    c. wherein the rigid mounting body is inserted through the first retention device and opposing second retention device.

2. The mounting device of claim 1, further comprising a shaped attachment portion, capable of supporting a load, attached to the rigid mounting body.

3. The mounting device of claim 2, wherein the shaped attachment portion is attached to the rigid mounting body at least one point between the opposing retention devices.

4. The mounting device of claim 1, wherein the rigid mounting body is in the form of a flat plate.

5. The mounting device of claim 1, wherein the first retention device and opposing second retention device further comprise at least one aperture each.

6. The mounting device of claim 1, wherein the rigid mounting body further comprises a hinged portion.

7. The mounting device of claim 2, wherein the shaped attachment portion is a ring.

8. The mounting device of claim 2, wherein the shaped attachment portion is U-shaped.

9. A wheel chock device for supporting a vehicle comprising:
    a. a bar bent to form opposing bottom portions, opposing side portions and a U-shaped top portion;
    b. a substantially flat plate forming a base attached to said bar bottom portions;
    c. at least one retention device rigidly attached to the flat plate, the retention device comprising:
        i. a cargo control track insert, the insert having upper and lower notches which define at least one adjacent resilient finger which extends beyond the opposing edges of a receiving member receptacle
        ii. a positive engagement latch, movably mounted on the retention device, the positive engagement latch being movable between a notch blocking position and a release position, and
        iii. a positive engagement latch operating means, mounted on the retention device, capable of selectively enabling moving said positive engagement latch between the notch blocking position and the release position.

10. The wheel chock device of claim 9, further comprising a cargo control track having a plurality of openings formed therein capable of engaging the cargo control track insert.

11. The wheel chock device of claims 9, wherein the substantial flat plate further comprises a longitudinal hinged portion, capable of facilitating vertical flexion of the substantial flat plate.

12. The wheel chock device of claim 9, wherein a first retention device is rigidly attached to the one end of the substantially flat plate, and a second retention device is rigidly attached to the opposite end of the substantially flat plate.

13. The wheel chock device of claim 9, further comprising at least one stabilizing rod, wherein the stabilizing rod extends from the bottom portion to the top portion.

14. The wheel chock device of claim 13, wherein a first stabilizing rod extends from one bottom portion to the top portion and a second stabilizing rod extends from the opposite bottom portion to the top portion so that the first stabilizing rod is substantially parallel to the second stabilizing rod.

15. The wheel chock device of claim 9, further comprising stabilizing tabs that extend perpendicularly to the control track insert, capable of limiting pivotal movement relative to the cargo control track.

16. The wheel chock device of claim 9, wherein a first retention device is removable attached to the one end of the substantially flat plate, and a second retention device is removably attached to the opposite end of the substantially flat plate.

17. The wheel chock device of claim 9, wherein the rigid mounting body further comprises an attachment pin at each lateral end, capable of being inserted through the retention device.

18. The storage device support member of claim 1, further comprising stabilizing tabs that extend perpendicularly to the control track insert, capable of limiting pivotal movement relative to the cargo control track.

19. The storage device support member of claim 1 in combination with a rectangular receiving member receptacle, capable of stably and reversibly attaching to the first retention device and opposing second retention device.

20. A wheel chock device for supporting a vehicle comprising:
- d. a bar bent to form opposing bottom portions, opposing side portions and a U-shaped top portion;
- e. at least one retention device attached to the bar bottom portions, the retention device comprising:
    - i. a cargo control track insert, the insert having upper and lower notches which define at least one adjacent resilient finger which extends beyond the opposing edges of a receiving member receptacle
    - ii. a positive engagement latch, movably mounted on the retention device, the positive engagement latch being movable between a notch blocking position and a release position, and
    - iii. a positive engagement latch operating means, mounted on the retention device, capable of selectively enabling moving said positive engagement latch between the notch blocking position and the release position.

* * * * *